Figure 1:
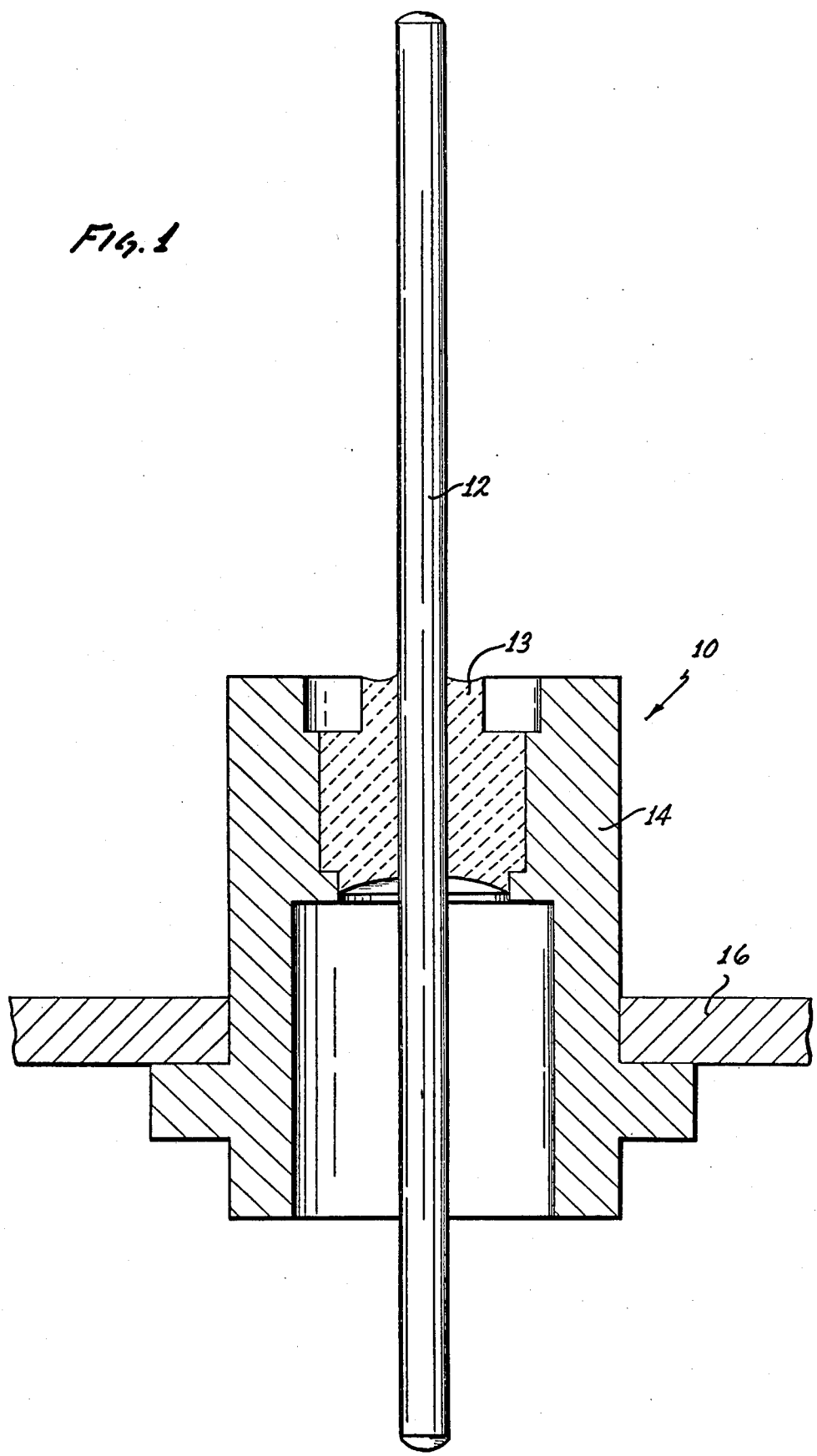

United States Patent [19]
Kyle

[11] 4,401,766
[45] Aug. 30, 1983

[54] CERAMIC SEAL BETWEEN SPACED MEMBERS SUCH AS A TERMINAL PIN AND A FERRULE

[75] Inventor: James C. Kyle, 610 Woodwillow St., Roseburg, Oreg. 97470

[73] Assignee: James C. Kyle, Roseburg, Oreg.

[21] Appl. No.: 372,117

[22] Filed: Apr. 27, 1982

Related U.S. Application Data

[62] Division of Ser. No. 836,659, Sep. 26, 1977, Pat. No. 4,352,951.

[51] Int. Cl.³ .......................... C03C 3/10; C03C 7/02; C03C 7/04
[52] U.S. Cl. ......................................... 501/15; 501/17; 501/18; 501/22; 501/23; 501/31; 501/32; 501/33; 501/61; 501/62; 501/75; 501/76
[58] Field of Search ...................... 501/15, 18, 22, 62, 501/61, 75, 31, 32, 33, 17

[56] References Cited

U.S. PATENT DOCUMENTS

| | | | |
|---|---|---|---|
| 2,916,388 | 12/1959 | Earl | 501/22 |
| 2,933,552 | 4/1960 | Schurecht | 501/15 X |
| 2,946,704 | 7/1960 | King et al. | 501/18 |
| 3,868,334 | 2/1975 | Van Loan | 501/17 X |
| 3,909,277 | 9/1975 | Dube | 501/22 |
| 3,963,505 | 6/1976 | Dumesnil et al. | 501/15 |
| 3,987,499 | 10/1976 | Scharbach et al. | 3/1.91 |
| 4,029,897 | 6/1977 | Mayer | 501/15 X |
| 4,049,416 | 9/1977 | Bloem | 501/22 X |
| 4,097,296 | 6/1978 | Thomas et al. | 501/15 |
| 4,352,951 | 10/1982 | Kyle | 174/152 GM |

FOREIGN PATENT DOCUMENTS

| | | | |
|---|---|---|---|
| 49-36808 | 10/1974 | Japan | 501/22 |
| 471315 | 5/1975 | U.S.S.R. | 501/62 |
| 544623 | 1/1977 | U.S.S.R. | 501/22 |

Primary Examiner—Helen M. McCarthy
Attorney, Agent, or Firm—Ellsworth R. Roston; Charles H. Schwartz

[57] ABSTRACT

Acid and alkali oxides are smelted for an extended period of time at a first elevated temperature above their melting temperatures. The smelted mixture is then quenched in water and fritted. The fritted mixture is then disposed between a pair of members which are to be hermetically sealed relative to each other. The fritted mixture is then at least partially fused in an oxygen atmosphere at a second temperature below the first temperature for a relatively short period of time. The at least partially fused mixture is then rapidly cooled in air. In this way, the mixture is provided with a partially amorphous state and a partially crystalline state. The crystals in the mixture are disposed primarily at the borders of at least a particular one of the members to be sealed.

The mixture hermetically seals the two members, is resistant to acids and alkalis and inhibits the propagation of cracks. The mixture is particularly adapted to seal steels such as stainless steels and steel alloys including cobalt and molybdenum or including nickel and chromium. The mixture is also adapted to seal noble metals such as platinum and also alloys such as those including nickel.

19 Claims, 2 Drawing Figures

| MATERIAL | RANGE OF PERCENTAGES BY WEIGHT |
|---|---|
| LEAD OXIDE (PbO) | 28-32 |
| SODIUM OXIDE (Na₂O) | 13-16 |
| ALUMINUM OXIDE | 1-2 |
| BORIC OXIDE | 2-4 |
| MANGANESE OXIDE | 6-11 |
| SILICON DIOXIDE | 38-42 |
| OPTIONAL | |
| AT LEAST ONE OXIDE SELECTED FROM THE GROUP CONSISTING OF COBALT OXIDE, NICKEL OXIDE, CHROMIUM OXIDE, COPPER OXIDE AND VANADIUM OXIDE | 1.5-3 |
| MOLYBDIC OXIDE | 0.5-3 |
| AT LEAST ONE MATERIAL SELECTED FROM THE GROUP CONSISTING OF ZIRCONIUM SPINEL, ZIRCONIUM SILICATE AND ZINC ZIRCONIUM SILICATE | 3-12 |

Fig. 2

| MATERIAL | RANGE OF PERCENTAGES BY WEIGHT |
|---|---|
| LEAD OXIDE (PbO) | 28-32 |
| SODIUM OXIDE ($Na_2O$) | 13-16 |
| ALUMINUM OXIDE | 1-2 |
| BORIC OXIDE | 2-4 |
| MANGANESE OXIDE | 6-11 |
| SILICON DIOXIDE | 38-42 |

OPTIONAL

| | |
|---|---|
| AT LEAST ONE OXIDE SELECTED FROM THE GROUP CONSISTING OF COBALT OXIDE, NICKEL OXIDE, CHROMIUM OXIDE, COPPER OXIDE AND VANADIUM OXIDE | 1.5-3 |
| MOLYBDIC OXIDE | 0.5-3 |
| AT LEAST ONE MATERIAL SELECTED FROM THE GROUP CONSISTING OF ZIRCONIUM SPINEL, ZIRCONIUM SILICATE AND ZINC ZIRCONIUM SILICATE | 3-12 |

CERAMIC SEAL BETWEEN SPACED MEMBERS SUCH AS A TERMINAL PIN AND A FERRULE

This is a division of application Ser. No. 836,659, filed Sept. 26, 1977, now U.S. Pat. No. 4,352,951.

This invention relates to materials which bond to particular metals and primarily steels such as stainless steels and alloys of steel with cobalt and/or molybdenum or alloys of steel with chromium and nickel. The invention further relates to methods of producing such materials and further relates to methods of bonding such materials to the metals such as the steels and also of bonding the metals to noble metals such as platinum and to certain other materials such as certain nickel alloys, alumina, ceramic and glasses so as to form a hermetic seal between these members.

Heart pacemakers employ electrical terminal pins made from a suitable noble metal such as platinum. These terminal pins are disposed within ferrules made from suitable metals including steels such as stainless steels and alloys of steel with cobalt and/or molybdenum. The ferrules are disposed on the lid of the housing for the heart pacemaker and provide an electrical shielding for the terminal pin.

Electrical insulation is provided between the terminal pin and the ferrule. This insulation should be hermetically sealed to the ferrule and should be able to withstand considerable mechanical and temperature stresses. The insulation should be able to withstand strong acids and alkalis such as sometimes exist in the body of a patient and the material should provide a high electrical insulation between the terminal pin and the ferrule. The material should be provided with these characteristics since the heart pacemaker is disposed within the body of a patient and should be able to operate for long periods of time in the patient's body without any deterioration in the quality of its operation even under the most unusual circumstances.

A substantial effort has been devoted to provide a hermetic seal between the terminal pin and the ferrule in a heart pacemaker with the properties described above. Such efforts have not been successful. A successful hermetic seal has not been produced between the terminal pin and the ferrule by the insulations now in use. Furthermore, the insulations now in use have not been able to withstand mechanical and temperature shocks and have not been resistant to strong acids and alkalis. As a result, heart pacemakers have had to be replaced in patients' bodies far more often than the patients would wish, with resultant discomfort and anxiety and even debilitation to the patient.

This invention provides a material which overcomes the disadvantages discussed. The invention provides a hermetic seal between a pair of spaced members such as a terminal pin and a ferrule in a heart pacemaker. The invention is substantially impervious to shocks resulting from mechanical forces or abrupt changes in temperature. The material has a high dielectric constant so that it provides a very high electrical insulation between the two members that it is hermetically sealing. The material does not propagate cracks, thereby maintaining its properties of providing a hermetic seal and a high electrical insulation even under adverse circumstances. The material is also resistant to strong acids and bases.

As will be appreciated, all of the properties discussed above are particularly beneficial when the material is hermetically sealing a terminal pin and a ferrule in a heart pacemaker. This is particularly true since the heart pacemaker is now generally disposed in the body of a patient where it has to function dependably under all of the adverse conditions that a human body sometimes produces under adverse circumstances.

The material of this invention is formed from a plurality of oxides some of which are alkali and some of which are acidic. The material includes lead oxide, boric oxide and silicon dioxide which in combination define a flux. The material of this invention further includes aluminum oxide and manganese oxide and at least one oxide from a group consisting of sodium oxide, potassium oxide and calcium oxide.

The materials of this invention are mixed and then smelted at a first elevated temperature such as approximately 1800° F. for an extended period of time such as a period of four (4) or five (5) hours. The smelted mixture is subsequently quenched in water, thereby producing a frit. The fritted material is ground and pulverized and pressed into free forms and beads. The beads are inserted between the two members to be hermetically sealed. Preferably one of these members is made from a noble metal such as platinum and the other metal is made from a steel such as stainless steel or an alloy of a steel with cobalt and/or molybdenum or an alloy of steel with nickel and chromium. However, members made from other materials than those specified above can also be sealed. Some of these additional materials are not even metals.

The material is then fused in an oxygen atmosphere to the two members at a temperature preferably about 300° F. below the first elevated temperatures. Accordingly, when the material is smelted at a suitable temperature such as approximately 1800° F., the fusing temperature may be approximately 1500° F.–1600° F. The material and the two (2) members are fused at the temperature of approximately 1500° F. to 1600° F. for a relatively short period of time such as approximately twenty (20) to thirty (30) minutes. The material is then cooled in air.

In this way, the material of this invention is partially crystalline and partially amorphous in its final form. The crystalline structure of the material appears primarily at the boundary with the steel. The crystalline structure is so formed that it is bonded to the steel in a resilient relationship. In this way, the material is able to withstand stresses resulting from mechanical forces and abrupt changes in temperature. The characteristics of the material can be adapted to the characteristics of the particular members to which the material is sealed by adjusting the time and temperature of the smelting operation and the time and temperature of the fusing operation.

In addition to the oxides specified above, the material of this invention may include one or several other oxides. These oxides include molybdic oxide, zinc zirconium silicate, zirconium silicate and zirconium spinel. These oxides further include at least one from a group consisting of cobalt oxide, nickel oxide, chromium oxide, copper oxide and vanadium oxide. These additional oxides are preferably included in the material for reasons which will be discussed in detail subsequently.

In the drawings:

FIG. 1 is a simplified sectional view of a terminal for use in a heart pacemaker, the terminal including the material of this invention; and FIG. 2 is a chart showing the composition of this invention.

In one embodiment of the invention, a terminal generally indicated at 10 is provided for a heart pacemaker. A suitable embodiment of the terminal is disclosed by me in U.S. Pat. No. 4,220,813, issued Sept. 9, 1980, and assigned by me of record to the assignee of record of this invention. The terminal includes a terminal pin 12 disposed in concentric relationship to a ferrule 14.

Preferably, the ferrule 14 is made from a suitable material such as steel. The steel may be a stainless steel or an alloy of steel and cobalt and/or molybdenum. The stainless steel may be of the 300 or 400 Series and preferably that particular steel designated as 316L. The alloy of steel may be that designated as Haynes 25 (containing cobalt) or that designated by Latrobe Steel as MP35 (containing cobalt and molybdenum). The alloy may also be an alloy of steel with nickel and/or chromium.

The terminal pin 12 may be formed from a noble metal which is preferably platinum. However, other noble metals such as gold, silver, irridium and rhodium may also be used. The terminal pin 12 may also be formed from certain nickel alloys such as those designated by the trademarks "Rene 41" and "Inconel".

A suitable insulating material 13 is disposed between the terminal pin 10 and the ferrule 14 and is hermetically sealed to the terminal pin and the ferrule. Preferably the insulating material constitutes the material of this invention. The insulating material insulates the terminal pin 12 from the ferrule 14 and a lid 16 of the heart pacemaker when the ferrule 14 is attached to the lid.

The material of this invention may include the following materials in the following percentage ranges by weight:

| Material | Range of Materials by Weight |
|---|---|
| Lead oxide (PbO) | 28–32 |
| Silicon dioxide ($SiO_2$) | 38–42 |
| Sodium oxide ($Na_2O$) | 13–16 |
| Alumina ($Al_2O_3$) | 1–2 |
| Boric oxide ($B_2O_3$) | 2–4 |
| Manganese oxide (MnO) | 6–11 |

Potassium oxide or calcium oxide may be substituted for the sodium oxide in the material specified above but sodium oxide is preferred. The lead oxide, silicon dioxide and boric oxide constitute a flux in the above mixture. This flux tends to lower the melting point of the mixture and to insure that all of the different oxides in the mixture will become melted when heated to the smelting temperature specified below.

The mixture specified above may also include other materials. For example, molybdic oxide may be included in a range of approximately one half of one percent (0.5%) to three percent (3%) by weight. Furthermore, cobalt oxide may be included in a range of approximately one and one half percent (1.5%) to three percent (3%) by weight. Although cobalt oxide is preferred, nickel oxide, chromium oxide, copper oxide and vanadium oxide may also be used instead of cobalt oxide.

The mixture specified above may also include other materials in addition to those specified above. These may include at least one of zinc zirconium silicate, zirconium spinel and zirconium silicate. Such materials may be included in a range of approximately three percent (3%) to twelve (12%) by weight.

The material constituting this invention is initially smelted at a temperature of approximately 1800° F. to 1900° F. for a period of approximately four (4) or five (5) hours. The material is then quenched in water. This causes the material to become fritted. The smelting of the material at the temperature and for the time period specified above and the subsequent quenching of the material in water causes the resultant material to be partially amorphous and partially crystalline.

The relative proportions of amorphous and crystalline material are dependent upon the time and temperature of the smelting operation. Increased times and temperatures for the smelting operation produce increased proportions of crystallization of the material.

The resultant material is then ground and pulverized. Particles of different size are then mixed with a suitable material having a weight in the mixture of approximately one half of one percent (0.5%) to three percent (3%), and the resultant mixture is then pressed into beads. Polyethylene glycol (marketed under the trademark "Carbowax") or an animal fat may be used as the binder.

The terminal pin 12 and the ferrule 14 may be disposed in a die and the beads of the material 13 may be disposed in the die. The combination of the terminal pin, the ferrule and the material are then fused in an oxygen atmosphere for a relatively short period of time at a temperature below the temperature discussed above. For example, the combination may be fused in an oxygen atmosphere at a temperature of approximately 1500° F. to 1600° F. (preferably about 300° F. below the smelting temperature) for a period of approximately twenty (20) to thirty (30) minutes. The combination may then be quenched or rapidly cooled in air. The time and temperature of the fusing operation also control the relative proportions of the amorphous and crystalline characteristics of the material. Increased temperatures and/or increased times for the fusing operation tend to increase the crystallization of the material.

The different oxides in the material discussed above offer individual advantages in the material. For example, the lead oxide, silicon oxide and boric oxide act as a flux to facilitate the fusion of the different oxides in the mixture at the elevated temperatures. The lead in the flux is retained in the material by the sodium oxide and the alumina so that the lead cannot leach from the material in subsequent use. This is particularly important when the material hermetically seals the terminal pin 12 and the ferrule 14 in a heart pacemaker which is disposed in the body of a patient.

When the material is heated to a temperature of approximately 1800° F. for a period of approximately four (4) hours or five (5) hours and then quenched, the material is subjected to conditions which make it uncertain whether the material will be crystalline or amorphous. Some of the flux is still active in promoting a subsequent bond of the material to metal but the material has properties of becoming converted into a stable ceramic form. As a result, a portion of the material is amorphous and the remainder of the material is crystalline.

As previously described, the relative proportions of the amorphous and crystalline states are dependent upon the time and temperature of the smelting operation. The time and temperature are selected in accordance with the characteristics of the materials to be hermetically sealed. For example, the time and temperature are relatively high when a ferrule made from stainless steel is to be sealed to a terminal pin made from platinum since a relatively high proportion of crystalline characteristics is desired in the material to seal the material to stainless steel. However, when the material is intended to hermetically seal a ferrule made from an alloy of steel with nickel and chromium to a terminal pin made from Inconel or Rene 41, the combination of time and temperature (and primarily the time) is relatively low in order to preserve a relatively high proportion of amorphous characteristics in the material.

The subsequent heating of the material to a temperature of approximately 1500° F. to 1600° F. in an oxygen atmosphere for a limited period of time of approximately thirty (30) minutes is not at a sufficient time or temperature to convert all of the material into the ceramic form. However, the material adjacent to the ferrule 14 tends to become converted into a crystalline form more than the material removed from the ferrule. These crystals have different sizes and shapes and are randomly oriented so that they can yield to thermal and mechanical stresses imposed upon the terminal 10 without producing cracks which would tend to destroy the hermetic seal between the terminal pin 12 and the ferrule 14. Such yielding occurs by flexing or bending of the crystals of different sizes and shapes in the layer.

The rapid cooling of the material in air facilitates the conversion of the material into a polycrystalline form at the boundary with the ferrule 14 since a slow cooling would tend to facilitate the production of an amorphous glass. The net effect is a partially ceramic system frozen in an amorphous system in the material. As will be appreciated, the characteristics of this partially ceramic system in an amorphous system can be varied by varying the temperature and time for heating the material before it is air cooled. Thus, the material is able to maintain a hermetic seal even when heated and then quenched in water.

The amount of the polycrystalline formation in the material is dependent to a large extent upon the inclusion of the zirconium oxides in the material. For example, when the zirconium oxides are not included in the material, the amorphous characteristics of the material are increased by the use of the method described above. However, when zirconium oxides are included in the mixture to a percentage of at least approoximately three percent (3%) by weight, the crystalline characteristics of the material are significantly increased.

The heating of the material to a temperature of approximately 1500° F. to 1600° F. for a limited period of time in an oxygen atmosphere also produces other beneficial effects. For example, it causes the surface of the steel to become oxidized and the material constituting this invention to become chemically bound to the oxygen layer by common valence bonds with the oxygen in the layer. In other words, the oxygen is shared by the layer in the steel and by the material constituting this invention.

The heating of the combination of the stainless steel and the insulating material is an oxygen atmosphere for a limited period of time also has other beneficial results. It prevents the formation of carbides on the surface of the stainless steel. For example, carbides tend to be formed on the surface of stainless steel when stainless steel is heated for an extended period of time in the range of approximately 800° F. to 1400° F. under other than oxidizing parameters.

The coefficient of expansion of the material producing the hermetic seal in this invention can be varied by varying the time and temperature for heating the material before it is air cooled. Preferably the coefficient of expansion is chosen so that it is slightly greater than the coefficient of expansion of the material constituting the ferrule. This is advantageous because the material presses against the ferrule as it is rapidly cooled in air after it has been heated in an oxygen atmosphere to a temperature of approximately 1500° F. to 1600° F. for the period of approximately thirty (30) minutes. By pressing against the ferrule during such cooling, the material facilitates the production of a hermetic seal with the ferrule.

Because of the random orientation of the polycrystalline structure and the valence bonding of the oxygen to the external layer of the steel, the material does not fragment or crumble in use, even when subjected to thermal and mechanical shocks. For example, any tendency for the material to crack occurs radially toward the terminal pin 12 so as to preserve the characteristics of the material in providing an electrical insulation.

The material constituting this invention is also hermetically sealed to the terminal pin 12. For example, when the terminal pin 12 is made from platinum, the platinum tends to become chemically etched at its surface to a minor extent. This etching occurs from the action on the platinum, during the smelting and fusing operations, of the material constituting this invention. This etching may penetrate the surface of the platinum to a thickness of approximately one half mil (0.0005") to one mil (0.001") when the terminal pin has a thickness of approximately thirty (30) mils. The material constituting this invention then tends to become locked in the irregular surface produced in the surface of the terminal pin as a result of such penetration.

The bond between the platinum terminal pin and the material of this invention is actually quite thin in physical dimensions. This bond has a thickness on the order of twenty (20) Angstroms. The material of this invention at the surface of the platinum terminal pin tends to be more amorphous than the material at the surface of the ferrule 14, particularly, when the ferrule is made from a stainless steel.

The material constituting this invention is highly resistant to strong acids and alkalis. This results in part from the inclusion in the material of oxides and alkalis. For example, sodium oxide constitutes an oxide of a strong alkali and boric oxide provides a certain amount of acidic material. The inclusion of manganese oxide in the mixture also greatly enhances the resistance of the material to acids. The manganese oxide also acts to inhibit the cracking of the material with stresses from mechanical forces or changes in temperature.

The molybdic oxide can be omitted from the material constituting this invention but it has been found to be preferable to include this oxide. The molybdic oxide acts to enhance a strong oxygen valence bond of the material to stainless steel or alloys of steel. This is particularly true when the zirconium oxides are also included in the material.

The cobalt oxide also could be eliminated but it has been found that the material tends to be slightly degraded by such omission. The cobalt oxide tends to provide the material with color. Furthermore, it also tends to enhance the oxygen valance bond of the material with stainless steel or with alloys of steel. The cobalt oxide also tends to increase the coefficient of thermal expansion of the material to the desired value. Instead of cobalt oxide, nickel oxide, chromium oxide, copper oxide and vanadium oxide can be used. However, such materials are not as advantageous in the material as cobalt oxide.

Zirconium spinel tends to increase the mechanical strength of the material. When introduced into the material, zirconium spinel is already in crystalline form so that it does not change as the material is heated and cooled as specified above. As a result, zirconium spinel acts as a filler in the material. Zirconium spinel tends to exist as a natural mineral and is preferably used in this form.

When the zirconium oxides are included in the material, zirconium silicate crystallizes in the presence of lead. The crystallization of the zirconium silicate is facilitated by the inclusion of zinc zirconium silicate in the mixture since this compound tends to become dissolved at a lower temperature than zirconium silicate. Zinc zirconium silicate and zirconium silicate tend to exist as natural minerals and are preferably used in this form.

The inclusion of zinc zirconium silicate in the material also offers other advantages. This material tends to form zinc silicate ($Zn_2SiO_4$) or a complex compound of zinc, oxygen and silica ($2\ ZnO.\ SiO_2$) having the same chemical composition as zinc silicate. These zinc compounds become crystallized in the form of Willemite crystals. The Willemite crystals are of a different size and shape than the crystals of zirconium silicate discussed in the previous paragraph. This facilitates the flexing and bending of the crystal layer adjacent to the ferrule when subjected to thermal and mechanical shocks.

The material constituting this invention also provides other advantages of some importance. For example, the material provides a high dielectric constant considerably greater than most other materials now in use. By way of illustration, the electrical insulation between the terminal pin 12 and the ferrule 14 is as high as $10^{18}$ ohms. This is important in such equipment as heart pacemakers which have to operate satisfactorily under all of the adverse sets of circumstances which a human body is capable of producing.

As is well appreciated, quartz has two different phases. The $\alpha$ phase exists at a relatively low temperature such as approximately 800° F. and the $\beta$ phase exists at a relatively high temperature such as approximately 1400° F. As the temperature of the quartz rises between approximately 800° F. and 1400° F., the phase of the quartz tends to change from the $\alpha$ phase to the $\beta$ phase. These phases and the changes in such phases occur only in quartz having ceramic properties and not in amorphous glass. The quartz in the $\alpha$ phase has different properties than the quartz in the $\alpha$ phase.

The material constituting this invention offers the advantages of compensating somewhat for changes in the characteristics of the ceramic material as it varies between the $\alpha$ and $\beta$ phases. Such compensation is especially pronounced when the zirconium oxides are included in the mixture and when Willemite crystals and the zirconium silicate crystals are produced and these crystals are concentrated at the boundary between the ferrule and the material constituting this invention.

The material constituting this invention also has other advantages of some importance. For example, when the operation of hermetically sealing the terminal pin 12 and the ferrule 14 has been completed, tests are made to determine if a hermetic seal has actually been produced. If a hermetic seal has not been produced, the combination of the terminal pin, the ferrule and the material may be fused as the temperature of approximately 1500° F. to 1600° F. in the oxygen atmosphere for an additional period of approximately thirty (30) minutes. Since the material is still somewhat amorphous, this additional fusing operation tends to facilitate the creation of the oxygen valence bond between the material and the ferrule. It also tends to facilitate the creation of a polycrystalline structure in the material, particularly at the surface adjacent the ferrule. As a result, any failure to produce a hermetic seal tends to become corrected.

The fusing of the insulating material at temperatures of approximately 1500° F. to 1600° F. in an oxygen atmosphere for a limited period of time offers certain advantages. One advantage is that the ferrule 14 cannot lose its properties of being resistive to corrosion, particularly when the ferrule is a stainless steel or an alloy of steel. Another advantage is that the surface of the ferrule 14 cannot become sensitive to carbide precipitation. If the surface of the ferrule 14 should become sensitive to carbide precipitation, it would lose its facility of being welded properly to other members.

Although the invention has been discussed above in connection with the sealing members constituting electrically conductive metals, the materials of this invention can be used to hermetically seal other materials in addition to those discussed. For example, the materials can be used to provide hermetic seals to ceramics and glasses. The material can be used to provide hermetic seals to such materials as alumina. When the material is used to provide hermetic seals to ceramics, glasses and alumina, it is provided with a greater proportion of amorphous characteristics than when it is hermetically sealed to stainless steel.

The term "polycrystalline" in the claims is intended to indicate an insulating material formed from a crystalline structure including crystals of at least two different materials. The term "polycrystalline" in the claims is further intended to indicate that the crystals of the different materials have individual parameters and that the crystals of the different materials are intermixed to provide the insulating material with a combination of properties not obtained from the crystals of any single material.

Although the present invention has been described with reference to particular embodiments, it is to be appreciated that various adaptations and modifications may be made and the invention is only to be limited by the appended claims.

I claim:

1. In an electrical insulating material having properties of producing a hermetic seal, the combination of the following materials in the following range of percentages by weight:

| Material | Range of Relative Percentages by Weight |
|---|---|
| Lead oxide (PbO) | 28–32 |
| Silicon dioxide ($SiO_2$) | 38–42 |
| Boric oxide ($B_2O_3$) | 2–4 |
| Aluminum oxide ($Al_2O_3$) | 1–2 |
| Manganese oxide (MnO) | 6–11 |
| Sodium oxide ($Na_2O$) | 13–16 |

2. The combination set forth in claim 1 including the following additional material:

| Material | Range of Relative Percentages by Weight |
|---|---|
| Molybdic oxide (MoO₃) | 0.5–3 |

3. The combination set forth in claim 1 including the following additional material:

| Material | Range of Relative Percentages by Weight |
|---|---|
| At least one oxide selected from a group consisting of zirconium spinel, zirconium silicate and zinc zirconium silicate. | 3–12 |

4. The combination set forth in claim 1 including the following additional material:

| Material | Range of Relative Percentages by Weight |
|---|---|
| At least one oxide selected from a group consisting of cobalt oxide, nickel oxide, chromium oxide, copper oxide and vanadium oxide. | 1.5–3 |

5. The combination set forth in claim 1 including the following additional materials:

| Material | Range of Relative Percentages by Weight |
|---|---|
| Molybdic oxide (MoO₃), | 0.5–3 |
| at least one oxide selected from a group consisting of zirconium spinel, zirconium silicate and zinc zirconium silicate, and | 3–12 |
| at least one oxide selected from a group consisting of cobalt oxide, nickel oxide, chromium oxide, copper oxide and vanadium oxide. | 1.5–3 |

6. The combination set forth in claim 1 wherein the lead oxide, the silicon dioxide and the boric oxide act as a flux to decrease the melting temperature of the material.

7. The combination set forth in claim 1 wherein the insulating material is partially amorphous and partially crystalline and has the properties of providing a hermetic seal through more than one reheating in an oxygen atmosphere at a temperature of approximately 1500° F. to 1600° F. for a period of time to approximately thirty (30) minutes.

8. The combination set forth in claim 7 wherein the insulating material has an electrical resistivity to approximately $10^{18}$ ohms and is highly resistant to strong acids and bases.

9. The combination set forth in claim 8 including the following additional material in the electrical insulating material:

| Material | Range of Relative Percentages by Weight |
|---|---|
| At least one oxide selected from a group consisting of zirconium spinel, zirconium silicate and zinc zirconium silicate | 3–12 |

10. The combination set forth in claim 9 including the following additional material in the electrical insulating material:

| Material | Range of Relative Percentages by Weight |
|---|---|
| Molybdic oxide | 0.5–3 |

11. The combination set forth in claim 10 including the following additional material in the electrical insulating material:

| Material | Range of Relative Percentages by Weight |
|---|---|
| At least one oxide selected from a group consisting of cobalt oxide, nickel oxide, chromium oxide, copper oxide and vanadium oxide | 1.5–3 |

12. A glass frit formed by mixing the following materials and then smelting the mixture at a temperature of about 1800° F. to 1900° F. for a period of approximately four (4) or five (5) hours and then quenching the smelted mixture in water:

| Material | Range of Materials by Weight |
|---|---|
| Lead oxide (PbO) | 28–32 |
| Silicon Dioxide (SiO₂) | 38–42 |
| Sodium oxide (Na₂O) | 13–16 |
| Alumina (Al₂O₃) | 1–2 |
| Boric oxide (B₂O₃) | 2–4 |
| Manganese oxide (MnO) | 6–11 |

13. A glass frit as set forth in claim 12 wherein the glass frit is partially amorphous and partially crystalline.

14. A glass frit as set forth in claim 13 wherein the glass frit is highly resistant to strong acids and bases.

15. A glass frit as set forth in claim 13 wherein the glass frit has an electrical resistivity as high as $10^{18}$ ohms.

16. A glass frit as set forth in claim 13 wherein the glass frit can be fused to members by heating in an oxygen atmosphere at a temperature of approximately 1500° F. to 1600° F. for a period of approximately thirty (30) minutes.

17. A glass frit as set forth in claim 13 including at least one oxide selected from a group consisting of cobalt oxide, nickel oxide, chromium oxide, copper oxide and vanadium oxide and having a range of percentages by weight between approximately 1.5% and 3%.

18. A glass frit as set forth in claim 13 including molybdic oxide in the range of approximately 0.5% to 3% by weight.

19. A glass frit as set forth in claim 13 including at least one material selected from the group consisting of zirconium spinel, zirconium silicate and zinc zirconium silicate and having a percentage by weight in the range of approximately 3% to 12%.

* * * * *